Nov. 11, 1969 — W. SCHIFFER — 3,477,554

TEMPERATURE CONTROLLED FRICTION CLUTCH

Filed Oct. 2, 1967

Inventor:
WALTER SCHIFFER
BY Leonard H. King
ATTORNEY

United States Patent Office 3,477,554
Patented Nov. 11, 1969

3,477,554
TEMPERATURE CONTROLLED FRICTION CLUTCH
Walter Schiffer, Hauptstrasse 12,
Niederhofheim, Germany
Filed Oct. 2, 1967, Ser. No. 672,037
Claims priority, application Germany, Oct. 3, 1966,
Sch 39,617
Int. Cl. F16d 11/06, 13/14
U.S. Cl. 192—81                                    1 Claim

ABSTRACT OF THE DISCLOSURE

A temperature-controlled two-part friction clutch employs a helically-wound, bimetallic element which is responsive to the temperature of the environment. When the temperature reaches a predetermined level the bimetallic element which is attached to the second clutch part contracts to seize the first clutch part to couple them together. The first clutch part is secured to a rotatable shaft and carries a plurality of fan blades.

---

Figure 1:
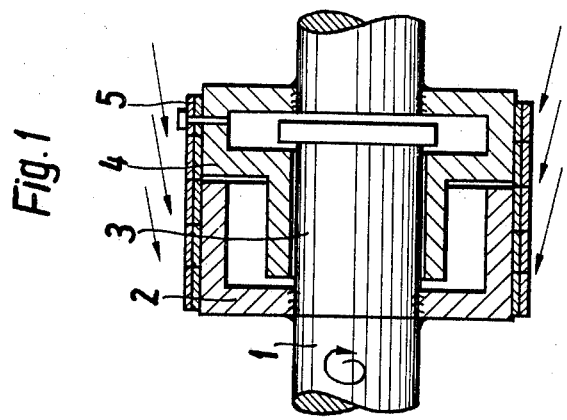

This invention relates to temperature-controlled friction clutches of the kind consisting of two members to be coupled together between which a temperature-sensitive clutch member mounted on one of the two members is provided.

In many fields of technology it is desirable to bring certain apparatus, motors, machines or the like as quickly as possible up to a certain optimum operating temperature and to ensure that this optimum operating temperature is maintained within predetermined tolerances independently of the period of operation and despite varying operational conditions, e.g. changes of ambient temperature or of the load of machines. The control devices necessary for this purpose are controlled by the temperature of certain elements of these devices or of the liquid or gaseous media associated therewith. This applies, for example, to combustion engines, in which the aim is to attain, after starting, an optimum operating temperature as quickly as possible. Experience shows that below the optimum operating temperature increased wear of the moving parts and a reduced performance is likely to occur. On the other hand, a higher than optimum operating temperature should equally be avoided because then also a decreased efficiency and an increased wear will take place.

This problem of control has been solved by known devices, such as bypass cooling systems associated with fans, water pumps and thermostats but normally these have the disadvantage that in the starting stage they at first act against a quick achievement of the opimum operating temperature. Thus, for avoiding the disadvantageous side effects, motors have been provided e.g. with devices which cause the fan or the water pump to remain out of action during the starting stage and to operate only when the operating temperature has risen to a value above the optimum operating temperature.

Such a known device consists, for example, of a fan, the rotor of which is connected by an electromagnetic clutch to its driving shaft, a thermostat located in the cooling water being fitted in the arrangement.

Another known device serving the same purpose is a temperature-dependent fluid clutch which connects the fan to its driving shaft. In the cold-operating state, the liquid of the clutch is in a container, whose feed pipe to the clutch is closed by a valve. This valve is opened or closed in dependence on temperature by a bimetallic strip exposed to the cooling air and the rotor is accordingly switched on or off.

Systems are also known, in which the fan is not driven by the motor crank shaft but separately by an electromotor which, is controlled by a thermostat.

In control systems with an electric current transmission, increased wear at the contact points due to fouling must be expected in crude and unprotected operations, as a result of which the functioning of the whole system and its life are strongly impaired.

All these devices, however, are relatively complicated, susceptible to breakdowns and expensive.

Friction safety clutches are also known, in which the engagement and disengagement of the clutch is effected by a nut connected to a clutch disc, which nut is adjusted by a temperature sensitive bimetallic spiral (German spec. No. 1,171,211). The actual sensing member thus controls an intermediate member which, for its part, only engages and disengages a clutch disc which is wasteful.

A proposal known from U.S. Patent No. 2,502,461 goes a step further, in that a metal sleeve responsive to temperature variations directly effects the connection between two shaft portions to be coupled. The temperature-sensing medium, in this case, has to be fed in a disadvantageous manner from the inside to the sleeve, the outer periphery of the sleeve being provided with a special clutch facing.

It is an object of the present invention to provide at low cost a simple, sturdy and quickly responsive temperature-controlled friction clutch with a sensing and control member of low thermal inertia, which avoids or at least substantially reduces the above mentioned disadvantages.

According to the invention there is provided a temperature controlled friction clutch comprising two members to be coupled together and a clutch member in the form of a helically wound bimetallic strip one end of which is connected to one of said two members whilst the greater part of the area of the strip adjacent the fixed end thereof is disposed in the vicinity of the other of said two members.

The condition of the two-point control "on" or "off" depends on the diameter of the bimetallic coil, which diameter, is controlled by the temperature of the coil. Dependent on the construction of the coil, in particular on the relative disposition of its two metallic components, an increase or decrease in diameter will result from either a higher or lower temperature which is transmitted via a liquid or gaseous medium to the coil. Corresponding to the structural arrangement of the coil i.e. whether it engages a member internally or externally the "on" or "off" state is reached selectively at a higher or lower temperature.

Figure 2:
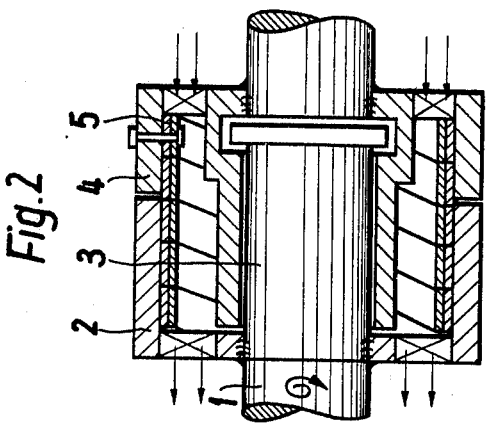
Figure 3:
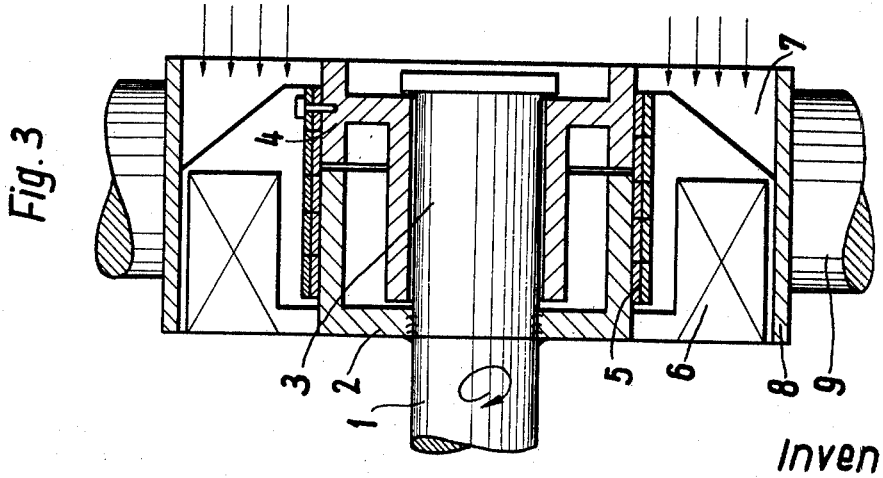

The invention will now be described with reference to some embodiments by way of example shown in the accompanying drawings:

FIG. 1 shows diagrammatically a cross section of an embodiment of a clutch, with two shaft ends which are connected by an external jaw arrangement, FIG. 2 shows diagrammatically a cross section of another embodiment with two hollow shafts which are connected by an internal jaw arrangement, and FIG. 3 shows diagrammatically a cross section of an embodiment of a clutch, as a fan control with an external jaw arrangement.

Referring to FIG. 1, a clutch disc 2 having a stub axle 3 is rigidly connected to the end of a continuously rotatable shaft 1. A clutch disc 4 is rotatably mounted on the stub axle 3. A bimetallic coil 5 is rigidly connected at one end to the clutch disc 4 and its long free portion is wrapped around the clutch disc 2. When the temperature rises the bimetallic spiral 5 reduces its diameter and positively embraces the clutch disc 2. The clutch is thus engaged. If the temperature of the bimetallic coil 5 drops below a certain value, its diameter is increased and the positive connection between the clutch discs 2 and 4 is interrupted.

FIG. 2 shows another arrangement of the temperature controlled friction clutch according to the invention, in which the engagement of the clutch is effected by an increase in the diameter of the bimetallic coil 5. The clutch disc 2 surrounds the longer free portion of the bimetallic coil. Upon a change of temperature, the effective direction of which depends on the geometrical arrangement of the metallic components of the coil—in contrast to the example according to FIG. 1—the diameter of the bimetallic coil 5 is increased and positively engages the inner surface of the clutch disc 2, whereby the clutch is engaged.

An application of the friction clutch, here in connection with a temperature-controlled fan, is shown as a complete apparatus in FIG. 3.

A clutch disc 2 with its stub axle 3 and auxiliary blades 6 is mounted on a continuously rotatable shaft end 1 and rigidly connected thereto. On the stub axle, there is rotatably mounted a clutch disc 4, on the cylindrical periphery of which spokes 7 carry a fan hub 8 with the main fan blades 9. The bimetallic coil 5 which effects the positive connection between the clutch discs 2 and 4 is rigidly connected at one end to the clutch disc 4 and its longer free portion is wrapped around the clutch disc 2. Due to the geometrical arrangement of the metallic components of the bimetallic coil 5, chosen in this case, its diameter is decreased upon a rise in temperature and it positively embraces the clutch disc 2. The clutch is thus engaged. If the temperature of the bimetallic coil 5 drops below a certain value its diameter increases and the positive connection between the clutch discs 2 and 4 is interrupted. The auxiliary blades 6 which rotate continuously together with the clutch disc 2, have the function of continuously circumcirculating the bimetallic coil 5 with the gaseous medium, by whose temperature the clutch is to be controlled. Assuming identical bimetallic coils the temperature control point of the clutch is determined by the choice of the outer diameters of the clutch discs 2 and 4.

If, due to frictional loss, a possible change of the temperature control point is taken into consideration, this system is advantageously to a great extent self-compensating. If for instance due to wear of the bimetallic coil 5 on its inner surface, its thickness is reduced, its embracing effect will be increased, which is based on the fact that the material of the clutch disc 2 has on the friction surface a greater resistance to wear than the bimetallic coil 5.

I claim:
1. A temperature controlled friction clutch for use in a gaseous medium having temperature variations that control said clutch comprising:
   (a) first and second clutch discs (2, 4) adapted to be coupled together;
   (b) a rotatable shaft (1) supporting said first clutch disc (2);
   (c) a helically wound, bi-metallic strip (5) secured at one end to said second clutch disc (4), the greater part of the area of said bi-metallic strip (5) being disposed in the vicinity of said first clutch disc (2);
   (d) an annular fan hub (8) radically spaced from said bi-metallic strip (5) to define a channel for the gaseous medium; and
   (e) a plurality of blades (6) secured to said first clutch disc (2), said blades (6) being positioned in said channel whereby the gaseous medium is circulated about said bi-metallic strip (5) when said shaft (1) rotates.

References Cited

UNITED STATES PATENTS 1,872,986  8/1932  Lane.
2,021,413  11/1935 Gille.
2,972,398  2/1961  Davis.

CARLTON R. CROYLE, Primary Examiner

ALLAN D. HERRMANN, Assistant Examiner

U.S. Cl. X.R.

192—74, 82; 230—270